Aug. 29, 1933.  B. E. EISENHOUR  1,924,091
SOUND METER
Filed June 24, 1929

Inventor:
Bert E. Eisenhour
By: Wallace R. Lane
Atty.

Patented Aug. 29, 1933

1,924,091

UNITED STATES PATENT OFFICE 1,924,091

SOUND METER

Bert E. Eisenhour, Aurora, Ill., assignor of one-half to George Fabyan, Geneva, Ill.

Application June 24, 1929. Serial No. 373,207

1 Claim. (Cl. 73—151)

The invention relates to a meter for indicating or registering alternating pressures or stresses, such as the pressure of sound and the like.

Among the objects of the invention is to provide a novel device for indicating or registering the pressure of sound or similar disturbances of elastic bodies, or even alternating pressures present in such devices as engines and the like.

Inasmuch as sound is the result of rapid oscillations, or alternating stresses or pressures imparted to the molecules of elastic bodies, or of motions of matter wherein the equilibrium of such bodies or matter has been disturbed either by shock or by friction, it has been heretofore difficult to ascertain the value of the effect thereof. Sound as scientifically understood and as embodied in the present application comprehends and includes those disturbances of elastic bodies both within and beyond the range of frequencies audible to the human ear. The audible range of sound frequencies is generally taken to lie between sixteen vibrations and from fifteen thousand to twenty thousand vibrations per second. The present invention is designed to indicate or register pressures or stresses from lower and higher sound frequencies.

The present invention has as one of its objects the provision of means for indicating the extent or amplitude of these disturbances. When a sonorous or sounding body is caused to vibrate or oscillate in a fluid body, such as air or the like, that portion of the fluid adjacent to the sounding body is compressed or condensed when the body moves in one direction while its movement in the opposite direction causes a rarefaction of that same portion of fluid. This wave of alternate condensed or compressed portions and rarefactions or portions of diminished density, constitute a sound wave, as is well understood by scientists. If then, means are provided for indicating the amount to which the fluidal body has been compressed or rarefied, because of the transmission of a sound wave therein, the pressure or amplitude of that sound may be measured.

It is, therefore, an object of the invention to provide a novel device having means movable proportionately to the amount of compression and rarefaction occurring in the fluid body and thus capable of indicating the amplitude or pressure of the sound, such indications being a function of the amount of disturbance in the fluid body.

In the embodiment selected to illustrate the invention, such movable means is in the nature of an expansible member so associated with a sound passage as to be affected by the sound fluid disturbance, the member expanding by either the condensation or rarefaction effects of the sound medium or by the combining effects of both. The expansible means, in a specific embodiment, is in the form of a bellows located in a closed chamber, the interior of the bellows communicating with the sound passage by way of a valve operative for passage of condensed sound medium in one direction only, that is, to the interior of the bellows.

The chamber exteriorly of the bellows, communicates also with the sound passage and through a valve operative in an opposite direction for rendering the rarefactions effective exteriorly of the bellows.

The production of sound at the opening of the passage causes the sound waves to act in the passage with alternate condensations and rarefactions which are effective through the valves and on the interior and exterior of the bellows to cause the latter to move or expand. Suitable means is connected to the bellows for proportionately moving an indicator relative to graduations on a dial for indicating the sound pressure in dynes per square centimeter or other suitable units.

The condensations of the sound wave operate the valve means associated with the space within the expansible member to cause an expansion thereof, while the rarefactions acting in an opposite direction, cause the valve means communicating with the chamber space surrounding the expansible member, to operate for exit of the fluid from that space. Either or both of these effects cause an expansion or extension of the expandible member.

Means are provided to indicate the extent of such extension which, when properly calibrated, indicates the amount of movement of the fluid caused by the sound wave, as also the pressure and amplitude of the sound produced.

The means for indicating such movement, in the specific embodiment illustrating the invention, comprises a screw member made up of fine twisted wires having at one end thereof a weighted needle point adapted to ride on a seat member carried by the expansible member, the other end having connected thereto an indicating needle.

The twisted wires pass through a helically grooved nut thus causing a rotation of the indicating needle when the expansible member rises, the weighted needle point returning of its own weight to contact the seat when the expansible member recedes to its normal or zero position.

In the specific embodiment selected to illustrate the invention, valve means are shown as operating to effect a withdrawal of the fluid body about and surrounding the expansible member as well as to effect a building up of fluidal pressure within the member. However, the invention comprehends the provision of either one or both of such means. Should it be desired to use one valve means only, that space of the chamber not in communication with the sound passage should be subjected to the fluidal pressure of that fluid in which the sound is transmitted, a recalibration of the indicating means being made accordingly.

Although I have shown, in the illustrative embodiment, means such as a resonator tube for the passage of sound to the movable member, it is to be understood that other means may be provided such as a horn or a small tube for the exploration of enclosed or otherwise inaccessible regions, and the invention comprehends the idea of providing a novel device for measuring the pressure of sound without such means.

The invention further comprehends the provision of novel valve means for the controlling of the passage of sound from the sound passage to the chamber, such means, in the embodiment selected to illustrate the invention, comprising spaced members having openings therein for the passage of the sound medium, and a membranous, filmy material, such as mica, celluloid, parchment, gold beater skin, glass, rubber, paper, glassine, cellophane, metal foils, or the chitinous membranes of neuropterous insects, such as the wings of insects including those of the housefly, between the openings and operable to permit passage of the sound medium or fluid in one direction only. A ribbed membranous material capable of vibrating rapidly having extremely small inertia, and great strength has been found to give very satisfactory results and will operate over a wide range of frequencies whether or not these frequencies be audible.

A further object of the invention is to provide novel means for adjusting the initial position of the indicating needle which comprises, in the illustrative embodiment of the invention, means for compressing more or less a rubber gasket upon which rests the expansible member, the raising or lowering of the expansible member and likewise the raising or lowering of the twisted wires, to cause a movement of the indicating needle, being effected by means of a thumb screw operable from the exterior of the chamber, the gasket means likewise providing a sealing means between that portion of the chamber surrounding the expansible member and passage means and that chamber portion within the member.

Other objects, advantages, capabilities and features are comprehended by the invention as will later appear, and are inherently possessed thereby.

Referring to the drawing.

Figure 1:
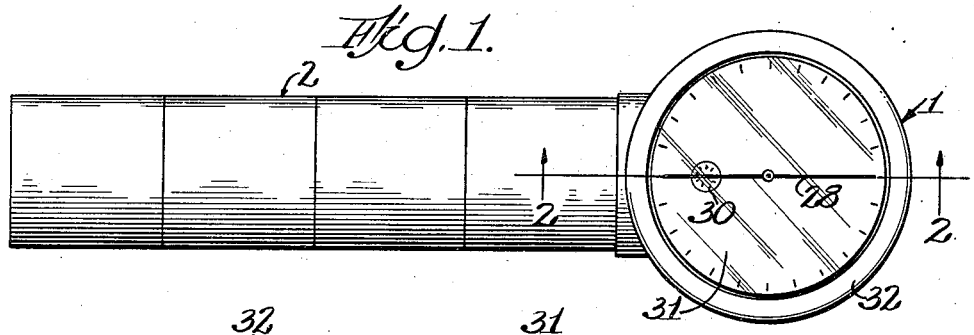
Fig. 1 is a top plan view of the embodiment selected to illustrate the invention.
Figure 2:
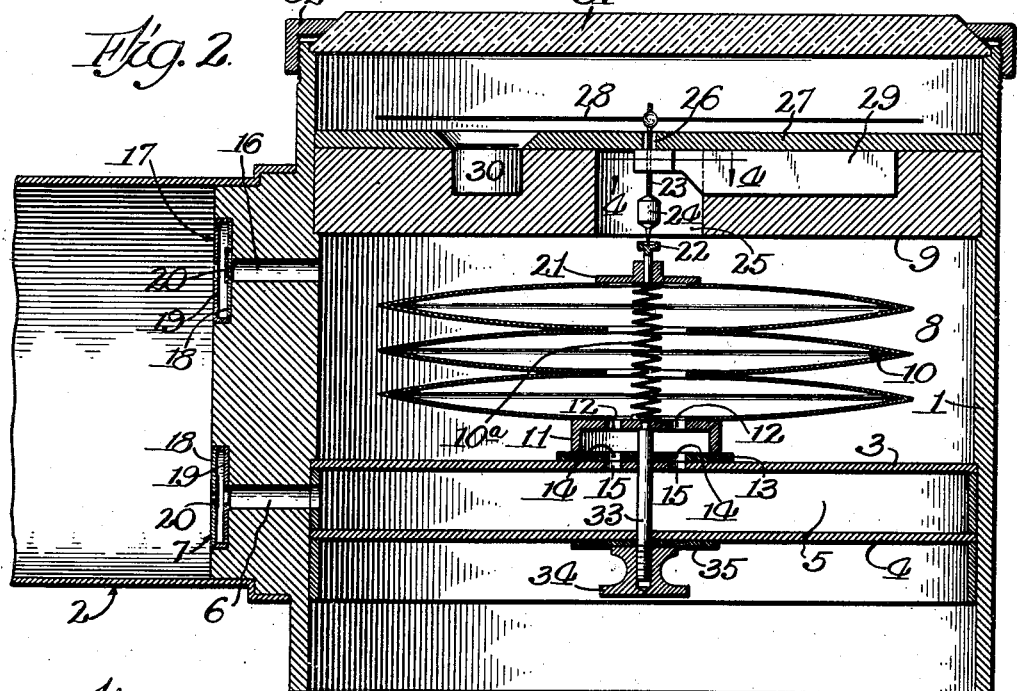
Fig. 2 is a fragmentary vertical cross sectional view of that embodiment taken in a plane represented by the line 2—2 in Fig. 1 of the drawing.
Figure 3:
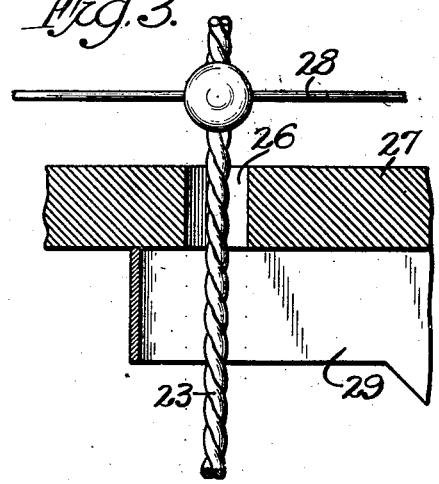
Fig. 3 is an enlarged fragmentary view in elevation of a portion of the twisted wire connected to the indicating needle and operable in helical grooves in the nut shown in the embodiment.

Referring now more in detail to the drawing, the embodiment selected to illustrate the invention is shown as comprising a chamber enclosed by a casing 1 in which are positioned sound pressure indicating means, the chamber communicating by way of passages with a resonator tube 2, the tube being preferably adjustable, as being telescopic, so that the length of the tube can be made to be of a length corresponding to one-quarter or any odd multiple thereof of the wave length of the sound to be measured.

The casing 1 is provided with partitions 3 and 4 defining therebetween a chamber 5 communicating by way of a passage 6 with the end of the resonator tube 2, the passage 6 having therein a valve means 7 to be later more fully described.

Above the partition 3 is a chamber 8 closed at its upper end by a partition 9. In the chamber 8 is a diaphragmatic expansible member or bellows 10 connected at its lower end to a cap 11 provided with apertures 12 for establishing communication between the interior of the expansible member and the interior of the cap. The cap 11 rests upon a rubber gasket 13 or the like having apertures 14 adapted to register with similar apertures 15 in the partition 3.

The chamber 8 communicates by way of a passage 16 with the end of the resonator tube 2, the passage 16 likewise being provided with a valve 17 similar to the valve 7 with the exception that this valve permits the escape of fluid from the chamber 8 to the resonator tube, while valve 7 permits the flow of fluid into the chamber 5 and not in the reverse direction.

The valve 7 comprises spaced discs or walls 18 and 19, the wall 18 having an inlet orifice means normally closed by a membranous filmy flap or member 20 permitting the passage of the fluid through the orifice means into chamber 5 by way of the outlet means in the wall 19, while it prevents passage of the fluid in the opposite or reverse direction. The valve 17 is constructed in all respects similar to valve 7 with the exception that the orifice means is positioned opposite to the orifice of the valve 7 and permits flow of the fluid out of the chamber 8 while preventing flow of the fluid in the reverse direction.

Figure 4:
Fig. 4 is a horizontal cross sectional view taken in a plane represented by the line 4—4 of Fig. 2 and showing the construction of the helically grooved nut used in the illustrative embodiment.

At the upper portion of the expansible or diaphragmatic member is a cap 21 recessed to receive the stem or shank of a seat member or step 22. In the concave top of seat 22 rests the needle point of a twisted wire or screw member 23 having at its lower end a weight 24 operating in an opening 25 in the partition 9. The upper end of the screw member passes through an opening 26 of a dial or indicating member 27, and has attached thereto an indicating needle 28 having a colored portion for indicating the pointing end. The screw 23 is made up of very fine twisted wires and passes through helical grooves of a nut 29, the nut being formed by bending a strip of metal as clearly shown in Fig. 4 of the drawing, the grooves being formed into the bent portions by a suitable die. The shank portion of the nut 29 is held in the partition 9 while the bent end containing the grooves, extends into the aperture or opening 25 for holding the screw member 23 in operative position.

A revolution indicator 30, having any suitable connection (not shown) with the bellows 10 may be provided in the partition 9 and dial 27 to indicate, if desired, the number of revolutions made by the needle 28, when measuring the pressure of sound, the indicator being graduated in any desired multiple of a unit turn of the needle 28.

A glass dial 31, the edges of which contact the end of the housing 1 is provided to seal the chamber 8 above the indicating dial 27 and is held in position by the annular sealing member 32 having internal threads adapted to engage with the exterior threads at the end of the housing.

It will be apparent that a rise of the diaphragmatic or expansible member 10 will cause a turning of the screw member 23 and indicating needle 28, the weight 24 of that member being adapted to bring the needle point of the screw 23 back into contact with the cap 22 whenever the member 10 recedes or is lowered.

In central apertured portions of the member 10 is provided a spring 10ª reacting between caps 21 and 11. This spring sustains the normal weight or load of the member 10. The cap 11 has connected therewith a stem 33 extending downwardly through an aperture in the rubber gasket 13 and partitions 3 and 4, and has a threaded portion at the end thereof engaged by a thumb nut 34 between which and the partition 4 is a leather gasket 35. By operation of the thumb nut 34, the gaskets 13 and 35 may be made to be fluid tight as also the zero reading of the indicating needle 28 may be effected by the tightening more or less of the nut.

When it is desired to measure the pressure of a sound such as that produced by a tuning fork, the fork is vibrated at the open end of the resonator tube, the length of the tube being adjusted to equal one-quarter or any odd multiple thereof of the wave length of the sound produced by the fork. As the fork vibrates to produce a sound or vibration of the molecules of the fluid matter in the resonator tube and to produce an undulatory motion thereof having alternate condensations and rarefactions, the valve 7 operates to permit the flow of the condensed portions of the fluid into the chamber 5 and into the member 10, while the valve 17 will be operated by the rarefied portions of the fluid to cause movement of air from the chamber 8 into the resonator tube 2, which will continue until the pressures in the member 10 and chamber 5 are equal to the maximum values of the condensations and rarefactions in the resonator tube 2. It will thus be seen that a pressure is set up within the member 10, while a partial vacuum is produced in the chamber 8 surrounding the member 10 which will cause an expansion thereof, the rising of which will cause a movement of the screw 23 and indicating needle 28 proportionate to the pressure or amplitude of the sound, inasmuch as the pressure and amplitude of a sound of constant frequency are directly proportional.

In the case of measuring only by condensations or rarefactions, either valve 17 or 7 and passage 16 or 6 is omitted, and either the chamber 8 or 5 is open to the atmosphere or the like. By properly calibrating, the correct sound pressure can be obtained in suitable units, such as dynes per square centimeter.

After a reading is taken, any suitable means may be used to permit entry or exit of air into or from chambers 8 and 5 (and interior of bellows), to re-establish a balanced or zero condition.

Although I have shown and described the invention as being applicable to and embodied in a metering device, it is to be understood that the invention is not limited thereto but comprehends its applicability to other than metering devices. As for example it may be used for indicating the extent of the alternating pressures or stresses in a steam or gas engine and other devices having similar effects.

While I have herein described and upon the drawing shown an illustrative embodiment of the invention, it is to be understood that the invention is not limited thereto, but may comprehend other constructions, arrangements of parts, details and features without departing from the spirit thereof.

Having thus disclosed the invention, I claim:

A sound pressure indicating device comprising a hollow expansible member adapted to expand upon increase of pressure of the medium therein, a sound medium condensation chamber having communication with the interior of said expansible members and operable for the accumulation therein of sound medium under pressure and for conducting said medium into said expansible member to increase the pressure of the medium therein and to cause said expansible member to expand, a rarefaction chamber enclosing said expansible member such that the rarefaction of sound medium in said rarefaction chamber acts upon the exterior of said expansible member to allow an expansion of said expansible member, a sound resonating chamber having communications with said condensation chamber and said rarefaction chamber, valves between said resonating chamber and said condensation and rarefaction chambers and being so operable that the valve between the resonating chamber and the condensation chamber acts to permit the passage of condensed sound medium from said resonating chamber to said condensation chamber to increase the pressure of the medium therein and in said expansible member, and the valve between the resonating chamber and the rarefaction chamber acts to permit the passage of the medium from the rarefaction chamber to the resonating chamber by the rarefactions caused in the resonating chamber to cause a reduction of pressure in said rarefaction chamber and exteriorly of said expansible member for the expansion of said expansible member, and indicating means connected to and operable by said expansible member when expanded to indicate the pressure of the sound produced in the medium in said resonating chamber.

BERT E. EISENHOUR.